United States Patent
Tseng

(10) Patent No.: US 11,403,877 B2
(45) Date of Patent: Aug. 2, 2022

(54) FACE RECOGNITION METHOD AND ELECTRONIC DEVICE USING SAME

(71) Applicant: PEGATRON CORPORATION, Taipei (TW)

(72) Inventor: Yu-Hung Tseng, Taiepi (TW)

(73) Assignee: PEGATRON CORPORATION, Taipei (TW)

( * ) Notice: Subject to any disclaimer, the term of this patent is extended or adjusted under 35 U.S.C. 154(b) by 135 days.

(21) Appl. No.: 16/512,052

(22) Filed: Jul. 15, 2019

(65) Prior Publication Data

US 2020/0089937 A1 Mar. 19, 2020

(30) Foreign Application Priority Data

Sep. 19, 2018 (TW) ................... 107132879

(51) Int. Cl.
*G06K 9/00* (2022.01)
*G06V 40/16* (2022.01)
*G06F 3/06* (2006.01)

(52) U.S. Cl.
CPC .......... *G06V 40/172* (2022.01); *G06F 3/0601* (2013.01); *G06V 40/161* (2022.01)

(58) Field of Classification Search
None
See application file for complete search history.

(56) References Cited

U.S. PATENT DOCUMENTS

| 2016/0261911 A1* | 9/2016 | Soundararajan | .... G06F 16/5838 |
| 2018/0285629 A1* | 10/2018 | Son | ................... G06K 9/00228 |

FOREIGN PATENT DOCUMENTS

| CN | 101216884 | 7/2008 |
| CN | 102124493 | 7/2011 |
| CN | 104573652 | 4/2015 |
| CN | 106682068 | 5/2017 |
| GN | 105550671 | 5/2016 |
| TW | I380222 | 12/2012 |
| TW | I466034 | 12/2014 |

OTHER PUBLICATIONS

"Office Action of China Counterpart Application", dated Mar. 17, 2022, p. 1-p. 9.

* cited by examiner

*Primary Examiner* — Wei Wen Yang
(74) *Attorney, Agent, or Firm* — J.C. Patents

(57) ABSTRACT

The application provides a face recognition method and an electronic device using the method. The method includes: obtaining face information from an image frame in a video stream; determining whether a first similarity between pre-registration information and the face information is higher than a first similarity threshold; determining that face recognition is successful if the first similarity is higher than the first similarity threshold, and updating real-time registration information with the face information; and determining that face recognition fails if the first similarity is lower than the first similarity threshold, and then determining whether a second similarity between the real-time registration information and the face information is higher than a second similarity threshold, where the second similarity threshold is higher than the first similarity threshold.

6 Claims, 3 Drawing Sheets

FACE RECOGNITION METHOD AND ELECTRONIC DEVICE USING SAME

CROSS-REFERENCE TO RELATED APPLICATION

This non-provisional application claims priority under 35 U.S.C. § 119(a) to Patent Application No. 107132879 filed in Taiwan, R.O.C. on Sep. 19, 2018, the entire contents of which are hereby incorporated by reference.

BACKGROUND

Technical Field

The application relates to an automatic recognition system, and in particular, to a face recognition method for a video stream and an electronic device using the method.

Related Art

Nowadays, with the vigorous development of automatic systems such as robots, technical demands for recognizing a specific object from a video stream grow significantly. Particularly, with a large amount of manpower invested in research, human face recognition progresses rapidly in recent years. In tests carried out based on Labeled Face in the Wild (LFW), an image recognition accuracy rate can reach 99.8%. However, it is difficult to reach such an accuracy rate in a video stream. For example, to ensure that 100 continuous images in the video stream are accurately recognized, the accuracy rate declines to 81% (that is, $0.998^{100}=0.818$).

On the other hand, during human face recognition, a face image of a person is usually given, and an image of the same person is searched for in registered images in a database. However, a human face may change as time goes by or may change when the styling changes. Therefore, the registered images in the database may be gradually out-of-date, which causes a decrease in the recognition accuracy rate.

SUMMARY

Accordingly, the application provides a face recognition method and an electronic device using the method, so that content of a video stream can be used as a recognition basis to improve an accuracy rate of face recognition.

The face recognition method according to the application is used for recognizing a face in a video stream. The electronic device according to the application includes a memory device and a processor. The memory device stores pre-registration information and real-time registration information. The processor is coupled to the memory device. The processor obtains a video stream and performs the following steps of the face recognition method: separately obtaining face information from at least one image frame in a video stream; determining whether a first similarity between pre-registration information and the face information is higher than a first similarity threshold; determining that face recognition is successful if the first similarity is higher than the first similarity threshold, and updating real-time registration information with the face information; and determining that face recognition fails if the first similarity is lower than the first similarity threshold, and then determining whether a second similarity between the real-time registration information and the face information is higher than a second similarity threshold, where the real-time registration information is generated based on face information corresponding to another image frame prior to the image frame in the video stream, and the second similarity threshold is higher than the first similarity threshold.

In an embodiment of the application, the face information includes a plurality of facial features, the pre-registration information includes a plurality of pre-registration features, and the step of determining whether the first similarity between the pre-registration information and the face information is higher than the first similarity threshold further includes: comparing the facial features with the corresponding pre-registration features to calculate the first similarity, and comparing the first similarity threshold with the first similarity; and determining that the face recognition is successful when the first similarity is higher than the first similarity threshold, and determining that the face recognition fails when the first similarity is lower than the first similarity threshold.

In an embodiment of the application, the real-time registration information includes a plurality of real-time registration features, and the step of determining whether the second similarity between the real-time registration information and the face information is higher than the second similarity threshold further includes: comparing the facial features with the corresponding real-time registration features to calculate the second similarity, and comparing the second similarity threshold with the second similarity; and determining that the face recognition is successful when the second similarity is higher than the second similarity threshold, and determining that the face recognition fails when the second similarity is lower than the second similarity threshold.

In an embodiment of the application, a plurality of image frames are extracted at intervals from the video stream, and the step of determining whether the first similarity between the pre-registration information and the face information is higher than the first similarity threshold further includes: generating a final face recognition result based on a plurality of face recognition results of the image frames.

In an embodiment of the application, the pre-registration information is stored in a non-volatile memory (NVM), and the real-time registration information is stored in a volatile memory.

Based on the foregoing description, in the face recognition method and the electronic device provided in the embodiments of the application, face information successfully recognized in the same video stream is used as a basis for subsequent recognition, so that a face recognition success rate of the video stream can be improved. On the other hand, in the embodiments of the application, a final face recognition result can be determined by using face recognition results of multiple image frames, so that the accuracy of face recognition can be improved by using a higher threshold.

To make the foregoing features and advantages of the application easier to understand, a detailed description is provided below with reference to embodiments in combination with accompanying drawings.

DETAILED DESCRIPTION OF THE EMBODIMENTS

Figure 1:
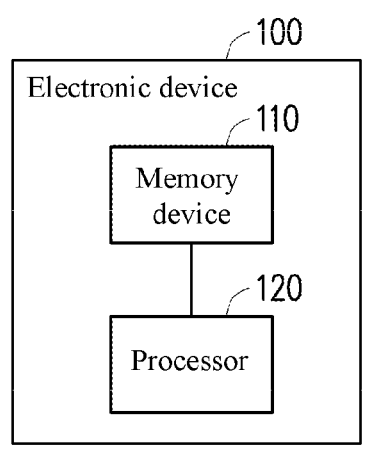
FIG. 1 is a schematic block diagram of an electronic device according to an embodiment of the application.

FIG. 1 is a schematic block diagram of an electronic device according to an embodiment of the application.

Referring to FIG. 1, an electronic device 100 includes a memory device 110 and a processor 120, and the memory device 110 is coupled to the processor 120. In some embodiments, the electronic device 100 is, for example, a personal computer (PC), a tablet PC, a smartphone, or a robot, but the application is not limited thereto.

The memory device 110 includes a volatile memory and an NVM. The NVM is configured to store pre-registration information of a face of a recognized person, where the pre-registration information is pre-stored in the NVM before the electronic device 100 performs the face recognition method. The volatile memory is configured to store real-time registration information generated for a currently recognized person during execution of the face recognition method.

The processor 120 is configured to control overall operation of the electronic device 100, including obtaining a video stream and performing the face recognition method to recognize a face in the video stream. In some embodiments, the processor 120 is, for example, various types of central processing units (CPUs) such as a dual-core CPU, a quad-core CPU, an octa-core CPU, a system-on-chip (SOC), an application processor, a media processor, a microprocessor, a digital signal processor, or other devices with a sufficient computing capability, which are not limited in the application.

In some embodiments, the electronic device 100 includes a built-in image capture device (not shown in the figure) such as a camera. The processor 120 may obtain the video stream from the built-in image capture device of the electronic device 100 to perform face recognition on the video stream. In some embodiments, the electronic device 100 is connected to an external image capture device in a wired or wireless manner, and the processor 120 obtains a video stream captured by the external image capture device to perform face recognition on the video stream. In some embodiments, the video stream is stored in the memory device 110, and the processor 120 can directly obtain the video stream from the memory device 110. In other words, the application does not limit a specific video stream obtaining manner of the processor 120 herein.

Figure 2:
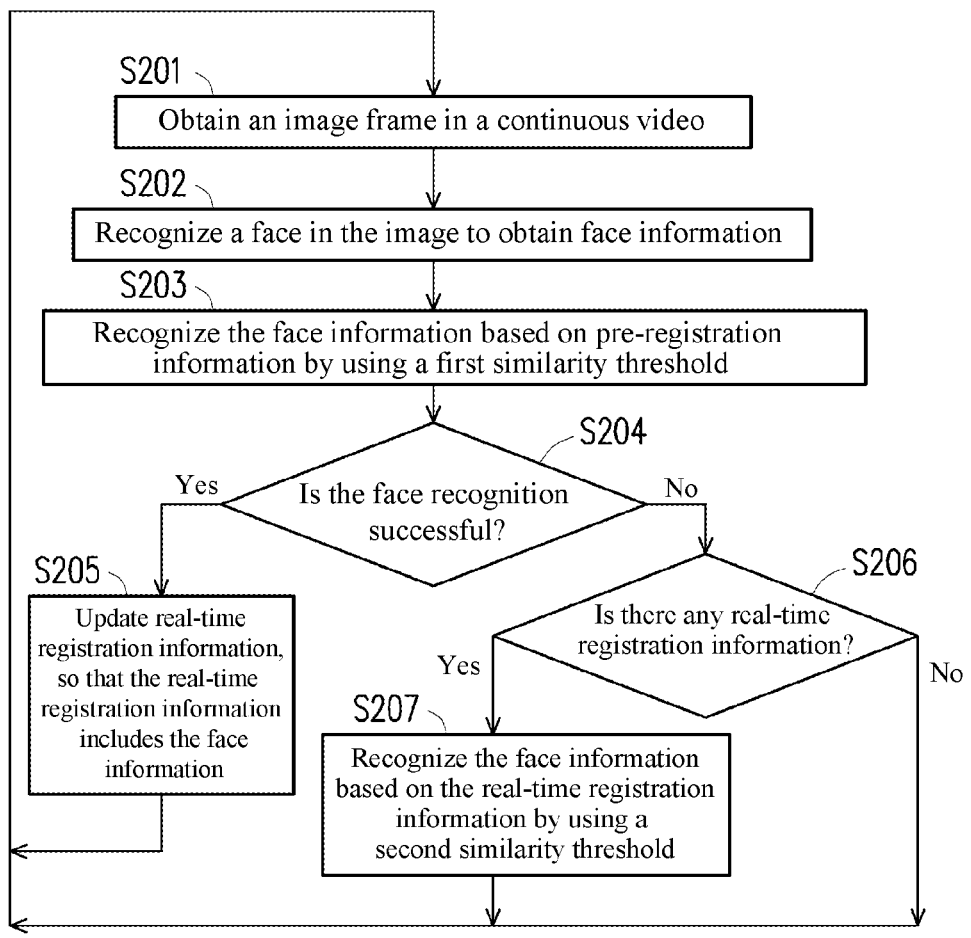
FIG. 2 is a flowchart of a face recognition method according to an embodiment of the application.

FIG. 2 is a flowchart of a face recognition method according to an embodiment of the application. The face recognition method in the embodiment of FIG. 2 may be performed by the electronic device 100 in the embodiment of FIG. 1, and description is made below in combination with the electronic device 100 in the embodiment of FIG. 1. It should be noted that, the application does not limit the type of the electronic device used for performing the face recognition method.

In some embodiments, when the face recognition method is started to be performed, pre-registration information is stored in the NVM, and no real-time registration information is stored in the volatile memory.

Referring to FIG. 2, in step S201, the processor 120 obtains an image frame in a video stream, and in step S202, the processor 120 performs face recognition on the obtained image and obtains face information. In some embodiments, the processor 120 performs face recognition on the image by using a pre-trained neural network model, to find face information in the image. In some embodiments, for example, the processor 120 may perform face detection on the image, perform pre-processing such as alignment, and then input the pre-processed image into the neural network model to perform face recognition. However, the application is not limited to the foregoing process.

Then, in step S203, the processor 120 recognizes the face information based on pre-registration information by using a first similarity threshold, and determines whether the face recognition is successful in step S204. For example, if the processor 120 determines that a first similarity between the pre-registration information and the face information is higher than the first similarity threshold, it is determined that the face recognition is successful, indicating that the processor 120 recognizes, from the pre-registration information, a face appearing in the image. On the contrary, if it is determined that the first similarity between the pre-registration information and the face information is lower than the first similarity threshold, it is determined that the face recognition fails, indicating that the processor 120 does not recognize, from the pre-registration information, the face appearing in the image.

When the processor 120 determines that the face recognition is successful, the process proceeds to step S205, and the processor 120 updates real-time registration information with the face information of the successfully recognized image, so that the real-time registration information includes the foregoing face information. Then, the process returns to step S201 to continue to obtain subsequent images for face recognition in the video stream.

When the processor 120 determines that the face recognition fails, the process proceeds to step S206, and the processor 120 determines whether there is real-time registration information in the volatile memory. If there is real-time registration information in the volatile memory, it indicates that the processor 120 has successfully recognized other image frames previously extracted from the video stream. Therefore, the real-time registration information already has face information corresponding to another image frame extracted previously (for example, according to the operation in step S205), and the process proceeds to step S207. On the contrary, if the processor 120 determines that there is no real-time registration information in the volatile memory, the process returns to step S201 to continue to obtain subsequent images in the video stream.

In step S207, the processor 120 recognizes the face information based on the real-time registration information by using a second similarity threshold, where the second similarity threshold is higher than the first similarity threshold. For example, if determining that a second similarity between the real-time registration information and the face information is higher than the second similarity threshold, the processor 120 determines that the face recognition is successful. On the contrary, if determining that the second similarity between the real-time registration information and the face information is lower than the second similarity threshold, the processor 120 determines that the face recognition fails. After the face recognition is finished, the process returns to step S201 to continue to obtain images in the video stream. Specifically, because the real-time registration information is closer to a current status of a recognized person, the processor 120 can determine, by using a higher similarity threshold, whether the face information in the image matches the real-time registration information. If the face recognition is successful, it indicates that the processor 120 recognizes, from the real-time registration information, the face in the corresponding image. On the contrary, if the face recognition fails, it indicates that the processor 120 does not recognize, from the real-time registration information, the face in the corresponding image.

It should be noted that, a lower similarity threshold used during face recognition represents a lower determining threshold when the processor 120 determines whether the face information matches the pre-registration information; therefore, a face recognition success rate is higher, but an accuracy rate is lower. In other words, when a lower similarity threshold is used for face recognition, it is easier to obtain a successful face recognition result, but a face recognition error occurs more easily. On the contrary, a higher similarity threshold used during face recognition represents a higher determining threshold when the processor 120 determines whether the face information matches the pre-registration information; therefore, the face recognition success rate is lower, but the accuracy rate is higher.

In some embodiments, the face information includes a plurality of facial features, and the pre-registration information includes a plurality of pre-registration features. In other words, when the recognized person performs registers a face on the electronic device 100 in advance, a plurality of pre-registration features is recorded in the NVM. The real-time registration information includes a plurality of real-time registration features, that is, real-time registration features of the real-time registration information are updated with facial features of the face information because the determining is successful in the step of determining whether the first similarity between the pre-registration information and the face information is higher than the first similarity threshold, but the application is not limited thereto. In some embodiments, for example, the facial features may be obtained by using a pre-trained neural network model. For example, an input of the neural network model is, for example, face information, and an output thereof includes, for example, facial features with 512-dimensional vectors, but the application is not limited thereto.

In some embodiments, for example, the pre-registration information includes pre-registration features with 512-dimensional vectors, and the face information obtained by the processor 120 from the image also includes facial features with 512-dimensional vectors. During face recognition, the processor 120 first compares multiple facial features with multiple corresponding pre-registration features to calculate a first similarity, and then determines whether the first similarity is higher than the first similarity threshold. If the first similarity is higher than the first similarity threshold, it is determined that the face recognition is successful; on the contrary, if the first similarity is lower than the first similarity threshold, it is determined that the face recognition fails.

In some embodiments, the first similarity threshold is set to 99.99%, but is not limited thereto. In addition, the first similarity threshold may be preset in the processor 120, or may be set by the recognized person. This is not limited in the application.

In some embodiments, the real-time registration information is cleared every once in a while. In some embodiments, when successfully recognizing the face information based on the pre-registration information by using a first similarity threshold, the processor 120 records the facial feature and updates the real-time registered feature of the real-time registration information with the facial feature.

In some embodiments, for example, the real-time registration information includes real-time registration features with 512-dimensional vectors, and the face information obtained by the processor 120 from the image also includes facial features with 512-dimensional vectors. During face recognition, the processor 120 first compares multiple facial features with corresponding multiple real-time registration features to calculate a second similarity, and then determines wither the second similarity is higher than the second similarity threshold. If the second similarity is higher than the second similarity threshold, it indicates that the face recognition is successful; on the contrary, if the second similarity is lower than the second similarity threshold, it is determined that the face recognition fails.

In some embodiments, the second similarity threshold is set to 99.999%; however, the second similarity threshold is not limited in the application. In addition, the second similarity threshold may be preset in the processor 120, or may be set by the recognized person. This is not limited in the application, provided that the second similarity threshold is higher than the first similarity threshold.

It should be noted that, the processor 120 does not update the pre-registration information by using the face information that is successfully recognized based on the real-time registration information. Specifically, the real-time registration information is generated according to previous "successfully recognized" face information, but is not generated according to "correctly recognized" face information. Therefore, the real-time registration information may include error information. The real-time registration information is not updated by using the face information that is successfully recognized based on the real-time registration information, so that error accumulation can be avoided, thereby maintaining the face recognition accuracy.

In some embodiments, to ensure the accuracy of real-time registration information, for example, the processor 120 determines, with a higher standard (such as a higher similarity threshold), whether to update the real-time registration information with face information that is successfully recognized based on the pre-registration information. For example, after the face information is successfully recognized based on the pre-registration information by using the first similarity threshold, the processor 120 determines, by using a third similarity threshold higher than the first similarity threshold, whether to update the real-time registration information with the face information successfully recognized by using the first similarity threshold. The processor 120 updates the real-time registration information with the face information only when the first similarity is higher than the third similarity threshold; the real-time registration information is not updated if the first similarity is lower than the third similarity threshold, and the process directly returns to step S201 to continue to obtain subsequent images in the video stream.

Through the face recognition method described in the embodiment of FIG. 2, real-time registration information closer to a current status of the recognized person is recorded in the volatile memory as long as face recognition performed on any image frame in the video stream is successful, so that a success rate of subsequent face recognition can be improved.

It should be noted that, use of a higher similarity threshold can ensure higher face recognition accuracy, but decreases the success rate. Therefore, in some embodiments, multiple images in the video stream are recognized separately by using a higher threshold, and a final face recognition result is determined by using face recognition results of the multiple images. Therefore, the accuracy can be increased while the success rate can be maintained. Next, refer to the following embodiment with reference to FIG. 3.

Figure 3:
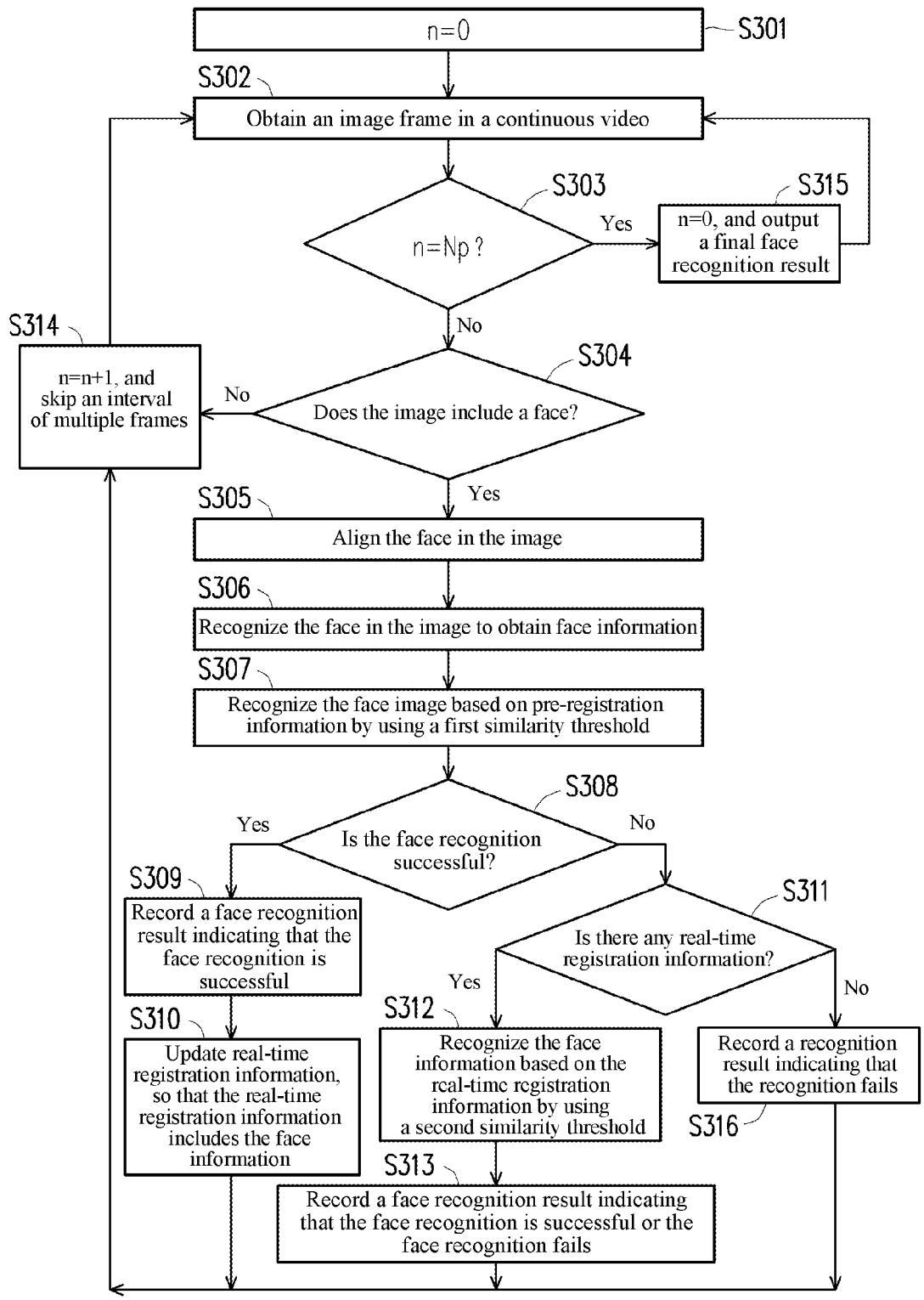
FIG. 3 is a flowchart of a face recognition method according to an embodiment of the application.

FIG. 3 is a flowchart of a face recognition method according to an embodiment of the application. In this embodiment, the processor 120 separately obtains a piece of face information from at least one image frame in the video stream, and extracts a plurality of image frames at intervals from the video stream. A quantity of interval frames may be a fixed quantity of frames or a random quantity of frames. This is not limited in the application. The face recognition method in the embodiment of FIG. 3 may be performed by the electronic device 100 in the embodiment of FIG. 1, and description is made below in combination with the electronic device 100 in the embodiment of FIG. 1. It should be noted that, the application does not limit the type of the electronic device used for performing the face recognition method.

Referring to FIG. 3, in step S301, a counter n is initialized to 0. To determine a final face recognition result by using face recognition results of a preset quantity Np of images, in some embodiments, the counter n is used to record the quantity of images already processed currently. However, the application does not limit a specific number of the preset quantity Np and a specific implementation of counting, and a person of ordinary skill in the art can implement counting as required.

In step S302, the processor 120 obtains an image frame in the video stream. In step S303, the processor 120 determines whether the quantity of currently processed images (counter n) is equal to the preset quantity Np. If the quantity of currently processed images is equal to the preset quantity Np, it indicates that the processor 120 has processed a preset quantity Np of images; in this case, the process proceeds to step S315; otherwise, the process proceeds to step S304 to start performing face recognition on the obtained image. In step S304, the processor 120 performs face detection on the image to determine whether the image includes a face.

If the processor 120 determines in step S304 that the image does not include a face, the process proceeds to step S314 to increase the counter n by 1, and after an interval of multiple image frames, the process returns to step S302 to obtain a next image frame for face recognition in the video stream. It should be noted that, because the image after an interval of multiple image frames is significantly different from the currently processed image, it can be avoided that processing is constantly performed on highly similar images to obtain identical results repeatedly. The application does not limit the quantity of interval frames herein, and a person of ordinary skill in the art can set the quantity as required.

If the processor 120 determines in step S304 that the image includes a face, the process proceeds to step S305 to perform alignment on the face in the image. In some embodiments, in addition to the face in the image, positions of face organs such as eyes and nose can also be found in the face detection. Accordingly, during alignment for the face, the processor 120 can turn the face in the image to a front-facing direction by using information such as a line connecting the eyes and the position of the nose.

In step S306, the processor 120 recognizes the face in the image and obtains face information. In step S307, the processor 120 recognizes the face information based on pre-registration information by using a first similarity threshold, and determines whether the face recognition is successful in step S308. Step S306 to step S308 are similar to step S202 to step S204 in the embodiment of FIG. 2, and the same details are not described herein again.

When the processor 120 determines, based on that a first similarity between the pre-registration information and the face information is higher than the first similarity threshold, that the face recognition is successful, the process proceeds to step S309. The processor 120 first records a face recognition result indicating that the face recognition for the image frame is successful, and then the process proceeds to step S310 to update the face information from the successfully recognized image to real-time registration information, so that the real-time registration information includes the face information. Then, the process proceeds to step S314 to increase the counter n by 1, and after an interval of multiple image frames, the process returns to step S302 to obtain a next image frame for face recognition in the video stream. Step S310 is similar to step S205 in the embodiment of FIG. 2, and the same details are not described herein again.

When the processor 120 determines, based on that the first similarity between the pre-registration information and the face information is lower than the first similarity threshold, that the face recognition fails, the process proceeds to step S311, and the processor 120 determines whether there is real-time registration information in the volatile memory. If there is real-time registration information in the volatile memory, it indicates that the processor 120 has successfully recognized other image frames previously extracted from the video stream. Therefore, the real-time registration information already has face information corresponding to another image frame extracted previously (for example, according to the operation in step S310), and the process proceeds to step S312.

On the contrary, if the processor 120 determines that there is no real-time registration information in the volatile memory, the process proceeds to step S314 to increase the counter n by 1, and after an interval of multiple image frames, the process returns to step S302 to obtain a next image frame for face recognition in the video stream. In some embodiments, before proceeding to step S314, the process first proceeds to step S316 to record a face recognition result indicating that the face recognition fails.

In step S312, the processor 120 recognizes the face information based on the real-time registration information by using a second similarity threshold, where the second similarity threshold is higher than the first similarity threshold. Step S312 is similar to step S207 in the embodiment of FIG. 2, and the same details are not described herein again.

After the face recognition for the face information based on the real-time registration information by using the second similarity threshold is finished, in step S313, a face recognition result corresponding to the real-time registration information recorded first (for example, a face recognition result indicating that the face recognition is successful or a face recognition result indicating that the face recognition fails is recorded corresponding to the real-time registration information); then the process proceeds to step S314 to increase the counter n by 1, and after an interval of multiple image frames, the process returns to step S302 to obtain a next image frame for face recognition in the video stream.

It should be noted that, the face recognition result indicating that the face recognition is successful or failed face recognition is recorded, for example, in the volatile memory, but the application is not limited thereto. Moreover, the application does not limit the quantity of faces that the processor 120 is capable of processing in an image. In other words, for example, the processor 120 may separately process all faces that are found in the image through face detection.

In step S315, the processor 120 generates a final face recognition result according to recorded Np recognition results, and resets the counter n. In some embodiments, for example, when the quantity of processed images reaches the preset quantity Np, the processor 120 determines whether there is a face recognition record indicating successful face recognition. If the processor 120 determines that there is a face recognition record indicating successful face recognition after processing of a preset quantity Np of images, a face recognition success is generated as a final face recognition result. For example, if the processor 120 determines that there is a face recognition result indicating that the face recognition is successful corresponding to a piece of pre-registration information or real-time registration information, the face recognition result is output as a final face recognition result. On the contrary, if the processor 120 determines that there is no face recognition record indicating successful face recognition after processing of a preset quantity Np of images, a face recognition failure is generated as a final face recognition result.

In the face recognition method described in the embodiment of FIG. 3, a final face recognition result is determined by using face recognition results of multiple images frames. Therefore, even if a higher threshold or lower sensitivity is used during face recognition to improve the accuracy of face recognition, the success rate can still be maintained.

In conclusion, in the face recognition method and electronic device provided in the embodiments of the application, face information successfully recognized in the same video stream is used as a basis for subsequent face recognition, so that a face recognition success rate of the video stream can be improved. On the other hand, in the embodiments of the application, a final face recognition result can be determined by using face recognition results of multiple images frames, so that the accuracy of face recognition can be improved by using a higher threshold.

Although the application has been described above by using embodiments, the embodiments are not intended to limit the application. Any person with ordinary skill in the art can make some changes and modifications without departing from the spirit and scope of the application. Therefore, the protection scope of the application should be subject to the definition of the appended claims.

DESCRIPTION OF REFERENCE NUMERALS

100: Electronic device
110: Memory device
120: Processor
S201-S207, S301-S316: Steps of a face recognition method

What is claimed is:

1. A face recognition method for recognizing a face in a video stream, the face recognition method comprising:
   initialing a counter, wherein the counter is configured to record a quantity of processed images;
   obtaining an image frame in the video stream;
   determining whether the quantity of the processed images is equal to a preset quantity;
   if the quantity of the processed images is less than the preset quantity, obtaining face information from the image frame in the video stream;
   determining whether a first similarity between pre-registration information and the face information is higher than a first similarity threshold;
   if the first similarity is higher than the first similarity threshold, recording a face recognition result indicating that the recognition is successful, updating the face information from the successfully recognized image frame to real-time registration information and keeping the pre-registration information, wherein the pre-registration information is stored in a non-volatile memory (NVM), and the real-time registration information is stored in a volatile memory;
   if the first similarity is lower than the first similarity threshold, determining that whether the real-time information exists in the volatile memory;
   if yes, recognizing the face information based on the real-time registration information by using a second similarity threshold, recording the face recognition result indicating that the recognition is successful or fails corresponding to the real-time registration information, and the second similarity threshold is higher than the first similarity threshold;
   if no, recording the face recognition result indicating that the recognition fails; and
   increasing the counter by 1 after recording the face recognition result, extracting a plurality of image frames at intervals from the video stream, generating a final face recognition result based on a plurality of face recognition results of the image frames if the quantity of the processed images is equal to the preset quantity.

2. The face recognition method according to claim 1, wherein the face information comprises a plurality of facial features, the pre-registration information comprises a plurality of pre-registration features, and the step of determining whether the first similarity between the pre-registration information and the face information is higher than the first similarity threshold further comprises:
   comparing the facial features with the corresponding pre-registration features to calculate the first similarity, and comparing the first similarity threshold with the first similarity; and
   determining that the face recognition is successful when the first similarity is higher than the first similarity threshold, and determining that the face recognition fails when the first similarity is lower than the first similarity threshold.

3. The face recognition method according to claim 2, wherein the real-time registration information comprises a plurality of real-time registration features, and the step of determining whether the second similarity between the real-time registration information and the face information is higher than the second similarity threshold further comprises:
   comparing the facial features with the corresponding real-time registration features to calculate the second similarity, and comparing the second similarity threshold with the second similarity; and
   determining that the face recognition is successful when the second similarity is higher than the second similarity threshold, and determining that the face recognition fails when the second similarity is lower than the second similarity threshold.

4. An electronic device, comprising:
   a memory device, comprising:
      a non-volatile memory (NVM), configured to store pre-registration information; and
      a volatile memory, configured to store real-time registration information; and
   a processor, coupled to the memory device, the processor obtaining a video stream to recognize a face in the video stream and performing the following steps:
      initialing a counter, wherein the counter is configured to record a quantity of processed images;
      obtaining an image frame in the video stream;
      determining whether the quantity of the processed images is equal to a preset quantity;

if the quantity of the processed images is less than the preset quantity, obtaining face information from the image frame in the video stream;

determining whether a first similarity between pre-registration information and the face information is higher than a first similarity threshold;

if the first similarity is higher than the first similarity threshold, recording a face recognition result indicating that the recognition successes, updating the face information from the successfully recognized image frame to the real-time registration information and keeping the pre-registration information;

if the first similarity is lower than the first similarity threshold, determining that whether the real-time information exists in the volatile memory;

if yes, recognizing the face information based on the real-time registration information by using a second similarity threshold, recording the face recognition result indicating that the recognition is successful or fails corresponding to the real-time registration information, and the second similarity threshold is higher than the first similarity threshold;

if no, recording the face recognition result indicating that the recognition fails; and increasing the counter by 1 after recording the face recognition result, extracting a plurality of image frames at intervals from the video stream, generating a final face recognition result based on a plurality of face recognition results of the image frames if the quantity of the processed images is equal to the preset quantity.

5. The electronic device according to claim 4, wherein the face information comprises a plurality of facial features, the pre-registration information comprises a plurality of pre-registration features, and that the processor determines whether the first similarity between the pre-registration information and the face information is higher than the first similarity threshold comprises:

comparing, by the processor, the facial features with the corresponding pre-registration features to calculate the first similarity, and comparing the first similarity threshold with the first similarity; and determining that the face recognition is successful when the first similarity is higher than the first similarity threshold, and determining that the face recognition fails when the first similarity is lower than the first similarity threshold.

6. The electronic device according to claim 5, wherein the real-time registration information comprises a plurality of real-time registration features, and that the processor determines whether the second similarity between the real-time registration information and the face information is higher than the second similarity threshold comprises:

comparing, by the processor, the facial features with the corresponding real-time registration features to calculate the second similarity, and comparing the second similarity threshold with the second similarity; and determining that the face recognition is successful when the second similarity is higher than the second similarity threshold, and determining that the face recognition fails when the second similarity is lower than the second similarity threshold.

\* \* \* \* \*